Oct. 1, 1935.    A. PASIN    2,015,726
COASTER WAGON
Filed Dec. 8, 1933    2 Sheets-Sheet 1
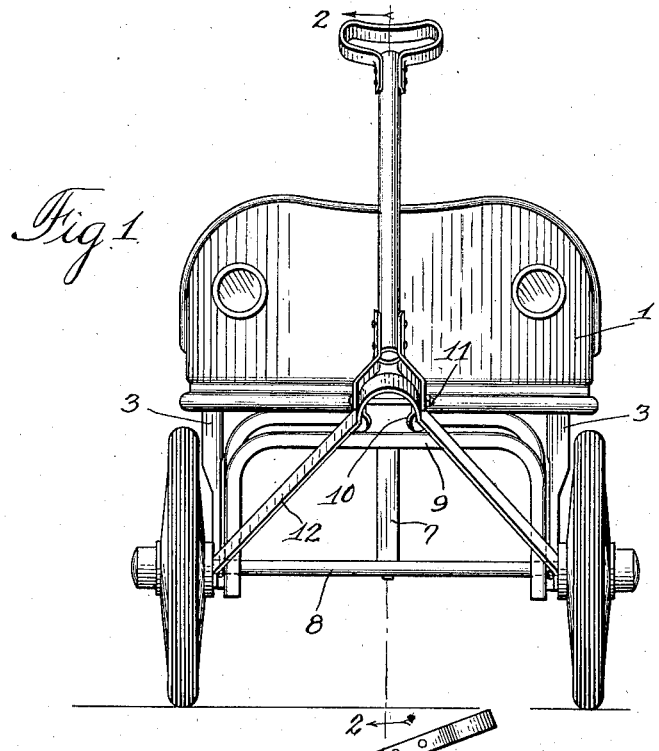
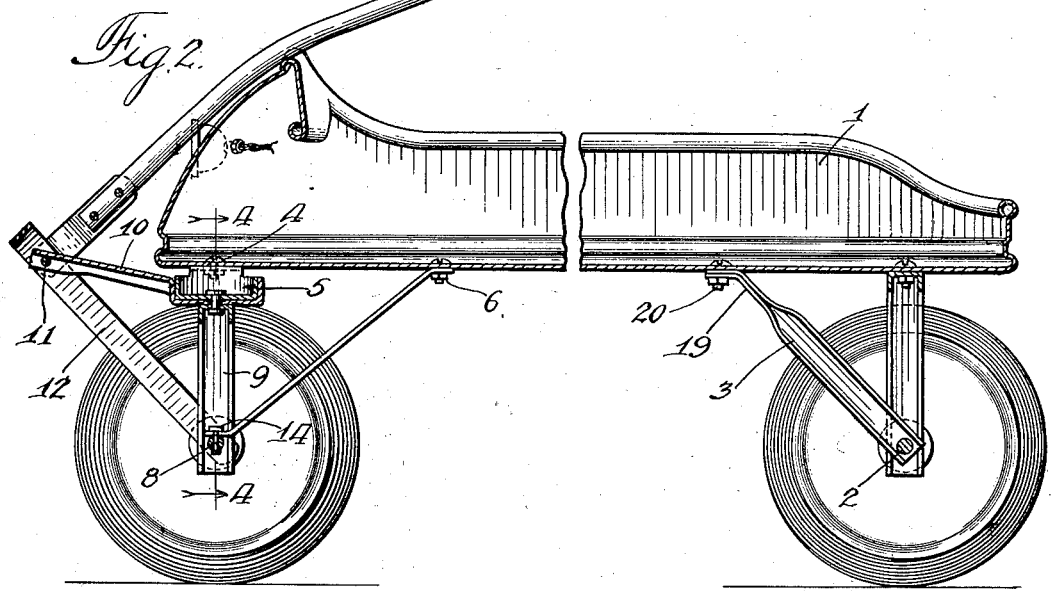
Inventor:
Antonio Pasin
By Jones, Addington, Ames & Seibold
Attys.

Oct. 1, 1935.  A. PASIN  2,015,726
COASTER WAGON
Filed Dec. 8, 1933  2 Sheets-Sheet 2
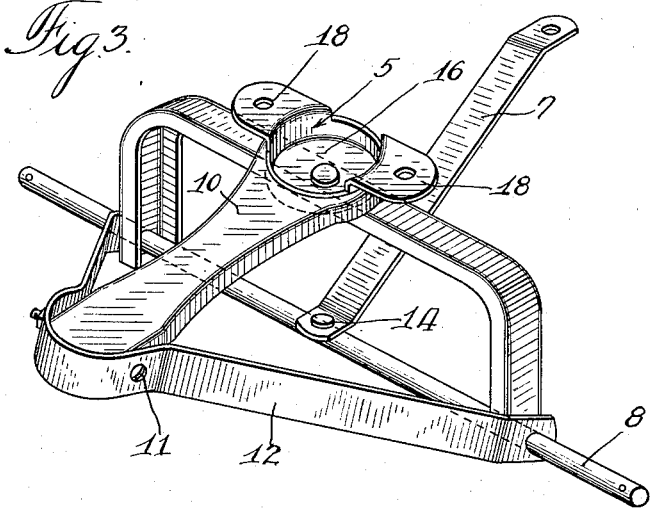
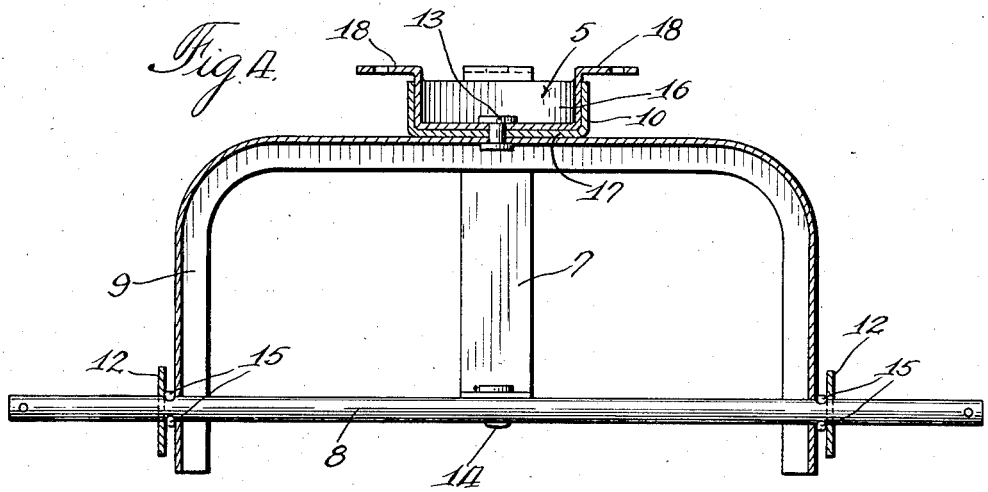
Inventor:
Antonio Pasin
By Jones, Addington, Ames & Szilard
Attys Patented Oct. 1, 1935

2,015,726

UNITED STATES PATENT OFFICE 2,015,726

COASTER WAGON

Antonio Pasin, Chicago, Ill., assignor to Radio Steel & Mfg. Co., Chicago, Ill., a corporation of Illinois Application December 8, 1933, Serial No. 701,415

6 Claims. (Cl. 280—87.5)

My invention relates to coaster wagons.

One of the objects of my invention is to provide a coaster wagon construction including a sub-assembly which can be readily packed for shipment and which may be easily assembled.

Another object of my invention is to provide such a sub-assembly construction comprising a bolster, axle, fifth wheel, and tongue connection members, which sub-assembly may be easily secured to the body by the use of simple connecting members.

Another object of my invention is to provide an improved sheet metal construction for the fifth wheel of the wagon.

Another object of my invention is to provide an improved sheet metal tongue connection member.

Another object of my invention is to provide improved means for preventing spreading of the bolster.

A further object of my invention is to provide an improved sheet metal brace between the rear axle and the body.

Further objects and advantages of the invention will be apparent from the specifications and claims.

In the drawings, in which my invention is illustrated:

Figure 1 is a front view of a coaster wagon embodying my invention;

Fig. 2 is a section on the line 2—2 of Fig. 1;

Fig. 3 is a perspective view of the front axle sub-assembly; and

Fig. 4 is a section on the line 4—4 of Fig. 2.

Referring to the drawings in detail, the construction shown herein comprises a body 1 which may be of sheet metal, a rear axle 2, a pair of braces 3 from the rear axle to the body, and a front axle sub-assembly (Figs. 3 and 4) which may be made up and shipped as a unit and which can be secured to the body simply by the use of two bolts 4 for connecting the fifth wheel 5 to the body and a third bolt 6 for connecting the brace 7 from the front axle 8 to the body.

This front axle sub-assembly (shown in detail in Figs. 3 and 4) comprises a U-shaped sheet metal bolster 9, the axle 8 extending through holes in the two arms of the bolster, a reinforced sheet metal connecting strap 10 extending from the central part of the bolster to the tongue connection bolt 11, a V-shaped sheet metal strap 12 extending from the axle 8 to the tongue connection bolt, and the sheet metal fifth wheel 5 pivotally connected with the bolster 9 and connecting strap 10 by means of a headed rivet 13 extending through registering openings in the fifth wheel 5, strap 10, and bolster 9. The sub-assembly may also include the metal strap 7 having a pivotal riveted connection 14 with the axle and having a hole for the insertion of the bolt 6 which secures it to the body 1.

In order to prevent the bolster from spreading, portions of the axle are pinched up to provide lugs 15 on the outside of the bolster arms. The bolster may be made of sheet metal of channel cross section which affords a rigid construction and gives a finished appearance to the bolster. The connecting strap extending from the bolster to the tongue connection may also be of sheet metal of channel cross section, this also providing a rigid construction and giving a finished appearance to the strap.

The fifth wheel 5 may be of pressed sheet metal having a central dished portion 16 which fits into a correspondingly dished portion 17 in the connecting strap 10. The fifth wheel is provided with laterally-extending ears 18 through which the body-securing bolts extend.

The straps 3 between the rear axle 2 and the body 1 may also be of sheet metal of channel cross section, the ends of the straps adjacent the body being pinched together at 19 to provide a flat end portion through which the body-securing bolts 20 extend.

It will be seen that the sub-assembly shown in Figs. 3 and 4 may be made up as a unit at the factory, thus providing a compact shipping construction and that this sub-assembly may be secured to the body after shipment simply by the use of the three body connection bolts.

It will also be seen that the construction is of a rugged nature that will stand rough usage and that the parts are so designed that they are inexpensive to manufacture and assemble.

Further modifications will be aparent to those skilled in the art and it is desired, therefore, that my invention be limited only by the prior art and the scope of the appended claims.

Having thus described my invention, what I claim and desire to secure by Letters Patent is:

1. A toy wagon construction comprising a bolster, a fifth wheel and a reach member extending from the upper part of the bolster for connection with a tongue, said bolster being of sheet material having a flat upper portion, said reach member being of sheet material and having a cup portion having a flat bottom lying against the flat upper portion of the bolster and said fifth wheel being of sheet material having a cup portion fitting within the cup portion of the reach member and having laterally extending wing portions secured to a wagon body.

2. A toy wagon construction comprising a bolster, a body, a fifth wheel secured to the body, a tongue, and a reach member extending from the fifth wheel and connected with the tongue, said bolster being of sheet material having a flat upper portion, said reach member being of sheet material and having a cup portion having a flat bottom lying against the flat upper portion of the bolster and said fifth wheel being of sheet material having a cup portion fitting within the cup portion of the reach member whereby the pull exerted on the reach member by the tongue is transmitted to the body through the interfitting of said cup portions.

3. A toy wagon construction comprising a bolster, a fifth wheel and a reach member extending from the upper part of the bolster for connection with a tongue, said bolster being of sheet material having a flat upper portion, said reach member being of sheet material and having a depressed peripherally arcuate portion having a flat bottom lying against the flat upper portion of the bolster and said fifth wheel being of sheet material having a depressed peripherally arcuate portion fitting within the depressed peripherally arcuate portion of the reach member and having laterally extending wing portions secured to a wagon body.

4. A toy wagon construction comprising a bolster, a body, a fifth wheel secured to the body, a tongue, and a reach member extending from the fifth wheel and connected with the tongue, said bolster being of sheet material having a flat upper portion, said reach member being of sheet material and having a depressed peripherally arcuate portion having a flat bottom lying against the flat upper portion of the bolster and said fifth wheel being of sheet material having a depressed peripherally arcuate portion fitting within the depressed peripherally arcuate portion of the reach member whereby the pull exerted on the reach member by the tongue is transmitted to the body through the interfitting of said depressed peripherally arcuate portions.

5. A toy wagon construction comprising an axle, a tongue, a bolster, a body, a fifth wheel secured to the body, a reach member extending from the fifth wheel and connected with the tongue, and a reach member extending from the axle and connected with the tongue, said bolster being of sheet material having a flat upper portion, said first reach member being of sheet material and having a depressed peripherally arcuate portion having a flat bottom lying against the flat upper portion of the bolster and said fifth wheel being of sheet material having a depressed peripherally arcuate portion fitting within the depressed peripherally arcuate portion of the reach member whereby the pull exerted on the reach member by the tongue is transmitted to the body through the interfitting of said depressed peripherally arcuate portions.

6. A toy wagon construction comprising a bolster, a body, a fifth wheel secured to the body, a tongue, a reach member extending from the fifth wheel and connected with the tongue, said bolster being of sheet material having a flat upper portion, said reach member being of sheet material and having a depressed peripherally arcuate portion having a flat bottom lying against the flat upper portion of the bolster and said fifth wheel being of sheet material having a depressed peripherally arcuate portion fitting within the depressed peripherally arcuate portion of the reach member whereby the pull exerted on the reach member by the tongue is transmitted to the body through the interfitting of said depressed peripherally arcuate portions, and a pivot pin extending through said depressed arcuate portions and the flat upper portion of the bolster for securing them together.

ANTONIO PASIN.